United States Patent
Goino

(10) Patent No.: US 7,110,961 B1
(45) Date of Patent: Sep. 19, 2006

(54) METHOD OF SELLING RIGHT ASSOCIATED WITH GAMES

(76) Inventor: Tadashi Goino, 7362-1, Ariake, Hodaka-cho, Minamiazumi-gun, Nagano-ken 399-8301 (JP)

( * ) Notice: Subject to any disclaimer, the term of this patent is extended or adjusted under 35 U.S.C. 154(b) by 527 days.

(21) Appl. No.: 09/723,228

(22) Filed: Nov. 27, 2000

(30) Foreign Application Priority Data

Sep. 4, 2000 (JP) .............................. 2000-267406

(51) Int. Cl.
G06Q 30/00 (2006.01)
G06F 17/30 (2006.01)
G07F 7/00 (2006.01)
Q06Q 40/00 (2006.01)

(52) U.S. Cl. .............................. 705/14; 705/27; 705/37

(58) Field of Classification Search .................... 705/1, 705/7, 8, 10, 12, 14, 26, 27, 500, 37; 463/1, 463/40, 42
See application file for complete search history.

(56) References Cited

U.S. PATENT DOCUMENTS

| | | | | |
|---|---|---|---|---|
| 5,034,807 A | * | 7/1991 | Von Kohorn | 358/84 |
| 5,227,874 A | * | 7/1993 | Von Kohorn | 358/84 |
| 5,794,207 A | | 8/1998 | Walker et al. | |
| 5,970,471 A | * | 10/1999 | Hill | 705/26 |
| 6,253,189 B1 | * | 6/2001 | Feezell et al. | 705/14 |
| 6,254,478 B1 | * | 7/2001 | Namanny et al. | 463/6 |
| 6,338,043 B1 | * | 1/2002 | Miller | 705/14 |
| 6,439,997 B1 | * | 8/2002 | Brasseur et al. | 463/40 |
| 6,470,079 B1 | * | 10/2002 | Benson | 705/9 |
| 6,604,996 B1 | * | 8/2003 | Namanny et al. | 463/6 |

FOREIGN PATENT DOCUMENTS

| | | | |
|---|---|---|---|
| GB | 2258065 A | * | 7/1991 |
| JP | 10207940 | | 8/1998 |
| JP | 11025158 | | 1/1999 |
| JP | 2000031230 | | 2/2000 |

OTHER PUBLICATIONS

Boycott phobia: Separating fact from fiction; American Advertising v10n2 pp. 18-20 Summer 1994.*
Nikkei Sangyo Shinbun, *Nikkei Industrial News Paper*, Japan, Jan. 1, 3, 2000, pp. 1.
The Chemical Daily, Japan, Sep. 7, 1992, pp. 14.
Daily Nikkan Sports, Japan, Jan. 12, 1994, pp. 5.

* cited by examiner

Primary Examiner—Igor N. Borissov
(74) Attorney, Agent, or Firm—Patterson, Thuente, Skaar & Christensen, P.A.

(57) ABSTRACT

A method of selling at least one right associated with contest participants through a computer network is disclosed. The method includes broadcasting contests between the participants through the network, and transmitting to potential buyers an indicator of advertising effectiveness for each participant. The potential buyers are connected to the network via terminals.

26 Claims, 8 Drawing Sheets

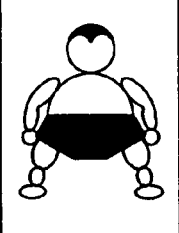

METHOD OF SELLING RIGHT ASSOCIATED WITH GAMES

BACKGROUND OF THE INVENTION

The present invention relates to a method of selling a right associated with a game through a computer network.

Generally, contests such as sumo, baseball, football, go, shogi and chess take place before an audience. Mass media such as television, newspaper, magazine and the like communicate the progress of contests to the general public. Players (individual players and teams) have a large number of fans.

As the notability and popularity of players increase higher, their values as advertising spokesmen increase. Enterprises choose players or teams with high popularity and notability to participate in commercial advertisements in television and magazines for increasing the effectiveness of advertisement for their goods. A commercial advertisement contract between a player and a sponsoring enterprise is generally made directly by the player or through an agency or a group to which the player belongs. The payment, which is determined through negotiations, varies depending mainly on showings (issue), past results, popularity and talent of a player. In other words, only an extremely small proportion of players who have made good showings can make commercial advertisement contracts and obtain high payments.

Players in a slump, on the other hand, will obtain low advertising payments, and will encounter difficulties in entering into commercial advertising contracts. Ordinary persons, managers of small-scale companies, and ordinary proprietors, in turn, encounter economical difficulties in making contracts of television commercials with famous players.

U.S. Pat. No. 5,794,207 discloses a conventional reverse auction method. This conventional method may be used by players themselves to sell their advertising rights and sponsor rights. However, it has been difficult for players to directly find advertisers using the conventional auction method.

Small-scale companies, personal stores and individuals may establish home pages (websites) on the internet for advertising their stores or goods at a low cost. The home pages and advertisements may be found by those who intend to look for the stores and goods, but are not visited by many persons and are not very effective.

SUMMARY OF THE INVENTION

It is an object of the present invention to provide a method of selling a right associated with a game, which is capable of allowing a player to readily obtain a sponsor as well as an advertiser to make a contract with a player for advertisement at a low cost.

To achieve the above object, the first aspect of the present invention provides a method of selling at least one right associated with contest participants through a computer network. The method includes broadcasting contests between the participants through the network, and transmitting to potential buyers an indicator of advertising effectiveness for each participant. The potential buyers are connected to the network via terminals.

The second aspect of the invention provides a method of selling at least one right associated with a contestant through a computer network. The method includes determining a selling price of the right in accordance with a predetermined mathematical expression using a numerical parameter that represents at least one of the following characteristics: achievements, popularity, ability, talent, audience rating and sales amount of the contestant, and transmitting the selling price to terminals connected to the computer network.

The third aspect of the invention provides a method of selling a plurality of rights possessed by a contestant participating in a contest through the internet. The method includes entering participants in the contest through the internet, broadcasting the contest through the internet, selling the right through the internet, receiving a selection of at least one of the rights from a buyer using a terminal connected to the internet, determining a selling price for the selected right in accordance with a predetermined mathematical expression using predetermined parameters indicative of advertising effectiveness of the contestant, displaying the selling price on the terminal of the buyer, and receiving information indicating approval through the internet when the buyer agrees to the displayed selling price.

The fourth aspect of the invention provides a server computer for selling at least one right associated with a contestant through a computer network. The server determines a selling price for the right in accordance with a predetermined mathematical expression using predetermined parameters indicative of advertising effectiveness of the contestant. The server transmits the selling price to terminals connected to the computer network.

Other aspects and advantages of the present invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

FIG. 8 is a schematic diagram of a detailed data page;

FIG. 9 is a schematic diagram of a sponsor registration page;

DETAILED DESCRIPTION OF PREFERRED EMBODIMENT

Figure 1:
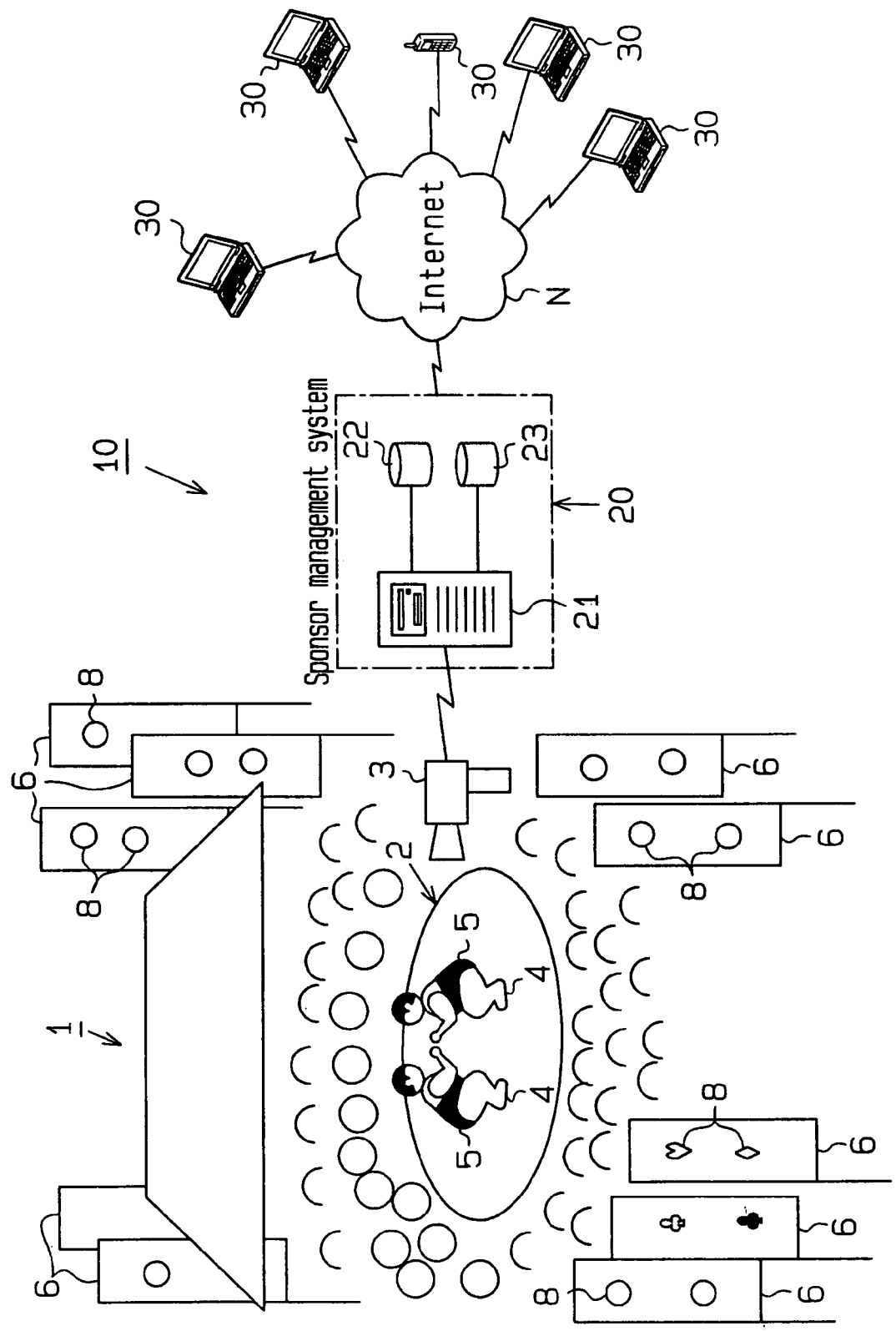
FIG. 1 is a schematic diagram illustrating a sales system in a preferred embodiment of the present invention.

FIG. 1 illustrates a sales system 10 for selling rights associated with a game through a computer network (internet) N. The sales system 10 includes a sponsor management system 20, the internet N, and a user (customer) terminal 30. The sponsor management system 20 has a Web server 21, a game management database 22, and a right management database 23. An application server may be added to the sponsor management system 20.

FIG. 1 shows a sumo match, which is recorded by a television camera 3 for internet broadcasting connected to the server 21. The server 21 relays the sumo match to the terminal 30 through the internet N. The sumo match may be held, for example, in a theme park called "Ukiyo Edo Mura", which is related to Japanese culture and is operated by a sumo match management company.

The server 21 broadcasts the sumo match and has data on a home page HP on which a variety of rights related to sumo are sold. A user displays the home page HP shown in FIG. 4 on the terminal 30. The user watches sumo matches on the screen of the terminal 30. A user who desires to sponsor a sumo wrestler enters required data on a predetermined screen linked to the home page HP for sponsor registration. Only users who have registered as sponsors are allowed to purchase associated rights.

Figure 2:
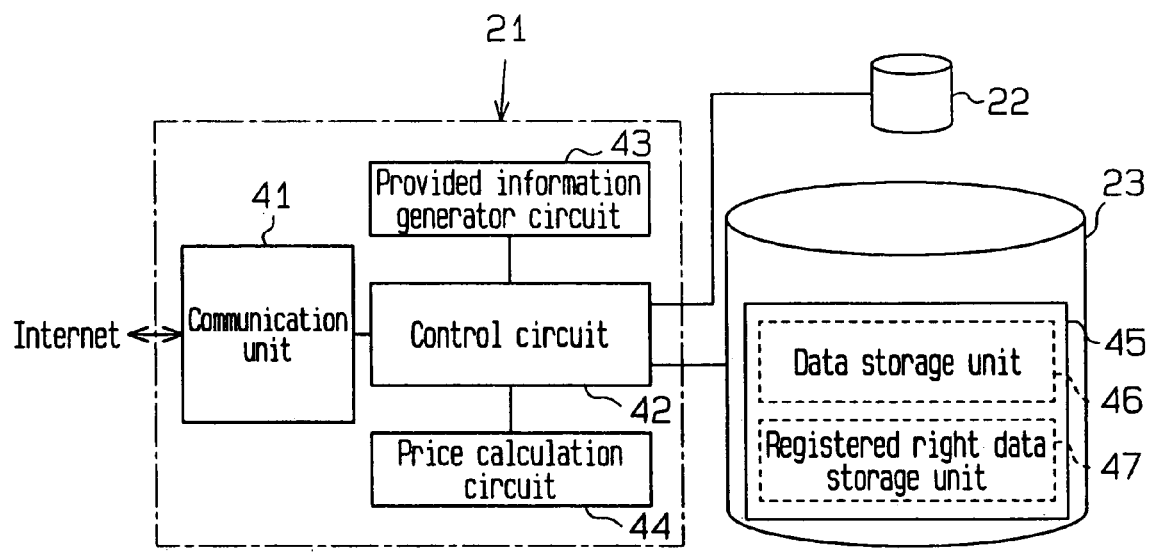
FIG. 2 is a schematic diagram illustrating a sponsor management system.

FIG. 2 schematically illustrates the sponsor management system 20. The sponsor management system 20 has a server 21. The server 21 comprises a communication circuit 41, a control circuit 42, a provided information generator circuit 43, and a price calculation circuit 44. The communication circuit 41 operates in accordance with a protocol (for example, HTTP) which supports communications through the internet. The right management database 23 has a sponsor data storage unit 45, which includes a data storage unit 46 and a registered right data storage unit 47. The control circuit 42, the provided information generator circuit 43 and the price calculation circuit 44 display a match, provide information to the user, calculate an advertising rate (right selling price), and determine a successful bidder of an auction for a right.

In the following, a world sumo system (World Flag Sumo) will be described.

Sumo, though having a long history, has not spread as an international sport. Thus, World Flag Sumo has rules that differ from those of Japanese sumo, to provide an international sport in which persons from any country may readily participate.

A sumo ring 2 (mound or mat) is provided at the center of a stadium 1. At various places in the stadium 1, flags 6 are hoisted for cheering wrestlers 4. In the sumo ring 2, national preliminary matches take place for each country, and representatives of states and districts compete with one another. In the world sumo system, there is an international meet in which the winners of the national preliminary matches compete with one another. A shogun (general) sits down on a pedestal outside the sumo ring 2. Across the ring 2 from the shogun, a group of bushi (warriors) sit. Also, advertising flags 6 of sponsors are hoisted around the sumo ring 2. Enterprises and individuals can display advertisements on the advertising flags 6 by paying sponsor rates. The sponsor rates are distributed to sponsored wrestlers 4 and a meet management company.

Meet participants may be collected publicly. Wrestlers recommended by the meet management company may participate. Fights are held in accordance with a tournament form. First, representatives in states or districts are determined.

The wrestlers 4, who wear specific trunks 5, have bare feet, and are naked in the upper half of the body, have a bout on the sumo ring 2, which is made of soil or a mat. Each contest involves two wrestlers 4, and a wrestler 4 wins if he pushes the competitor out of the sumo ring 2 or brings part of the body of the competitor (for example, a hand) into contact with the sumo ring 2. If a contest does not come to an end in a predetermined time, the contest is interrupted. After a short break, the contest is resumed. If the number of resumed contests meets a predetermined number, a winner is decided by a judgement.

A winner (representative) of each state or each district is given the title "daimyo" (feudal lord). Each state or each district is previously divided into two groups such as an east group and a west group or a north group and a south group. A match is held once per year for deciding the standing (ranking) in each group. The winner in each group is given a helmet and the title "shogun." The meet management company provides an east castle and a west castle in the theme park to two shoguns, respectively. The two shoguns may install exercise halls in their respective castles. The title of shogun and ranking is valid for one year. Therefore, a selection match is held in each state and in each district for deciding a new Shogun and ranking.

National matches are held three to six times per year in the stadium 1 in the theme park. Each national match may be held at a variety of locations other than the theme park.

The international match (World Flag Sumo Meet) is held once per two years or four years. Shoguns of respective countries participate in the international match. The winner of the international match is given the title "emperor."

Figure 3:
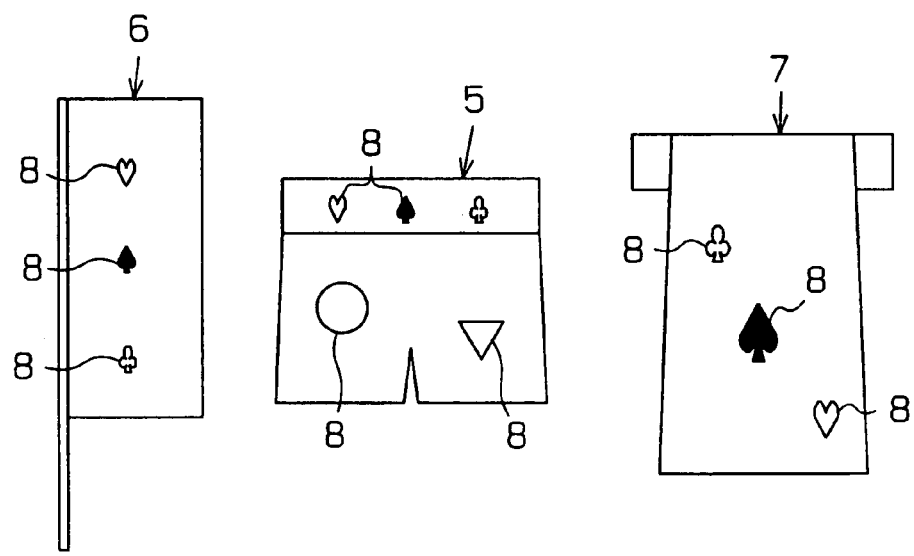
FIG. 3 is a schematic diagram illustrating articles on which advertisements are displayed.

A wrestler 4 may give himself an arbitrary registered name. A nickname specified by a sponsor is added to a registered name. The nickname includes a sponsor name and a product name. As illustrated in FIG. 3, a logo mark 8 of a sponsor is displayed on the trunks 5, flag 6 and an ornamental apron 7. In the international match, the national flag of the wrestler 4 is displayed on the trunks 5, flag 6 and ornamental apron 7. The meet management company has a right to report the matches. The theme park and the meet management company have a sponsorship right for parades of daimyos and shoguns and a publication right for portraits of daimyos and shoguns. The meet management company in each state or each country charges a sponsor rate. The meet management company may donate a portion of the sponsor rate, for example, to charitable organization such as Chernobyl sufferer relief fund.

In the theme park, a fencing match is also held in a manner similar to sumo. The kenjutsu (Japanese fencing) includes Iainuki (quick drawing of the sword) and Kendo (Japanese fencing). The theme park includes, for example, a game stadium for igo, shogi and the like. Also, the theme park may include another sport stadium. These contests are operated in a similar manner to the sumo matches.

Figure 4:
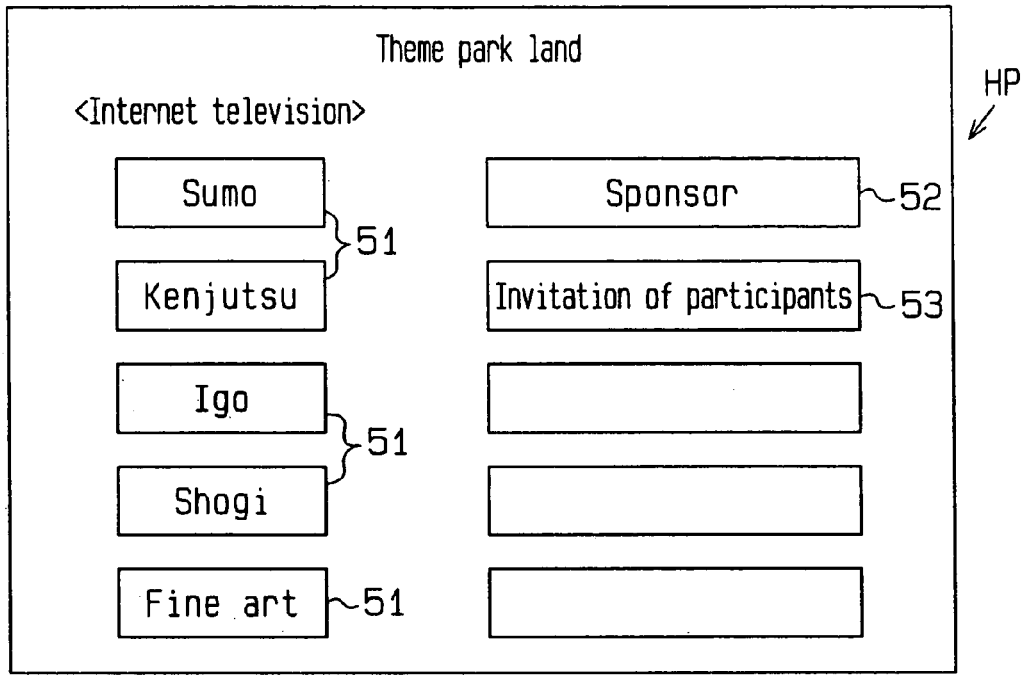
FIG. 4 is a schematic diagram illustrating a home page of a theme park.

The home page HP of the theme park displays a television button 51, a sponsor registration button 52, and a participant invitation button 53. Events include sports contests such as sumo and kenjutsu, games such as igo and shogi, and art exhibitions, as shown in FIG. 4. Upon depression on the television button 51, an internet television screen is displayed to televise a selected event.

Figure 6:
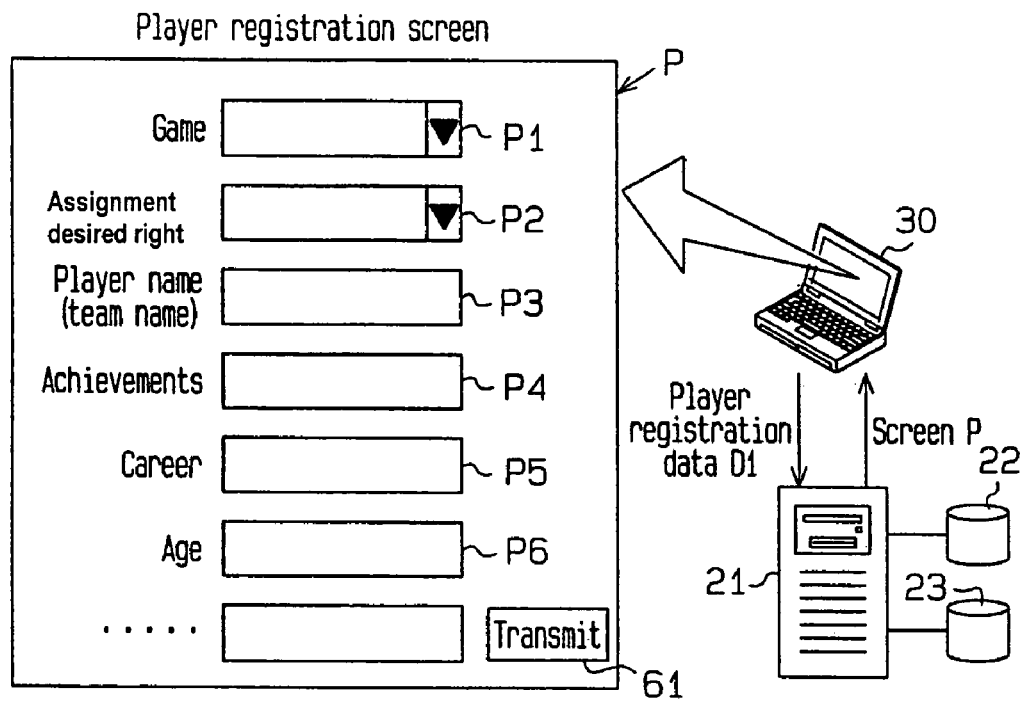
FIG. 6 is a schematic diagram of a player registration page.
Figure 7:
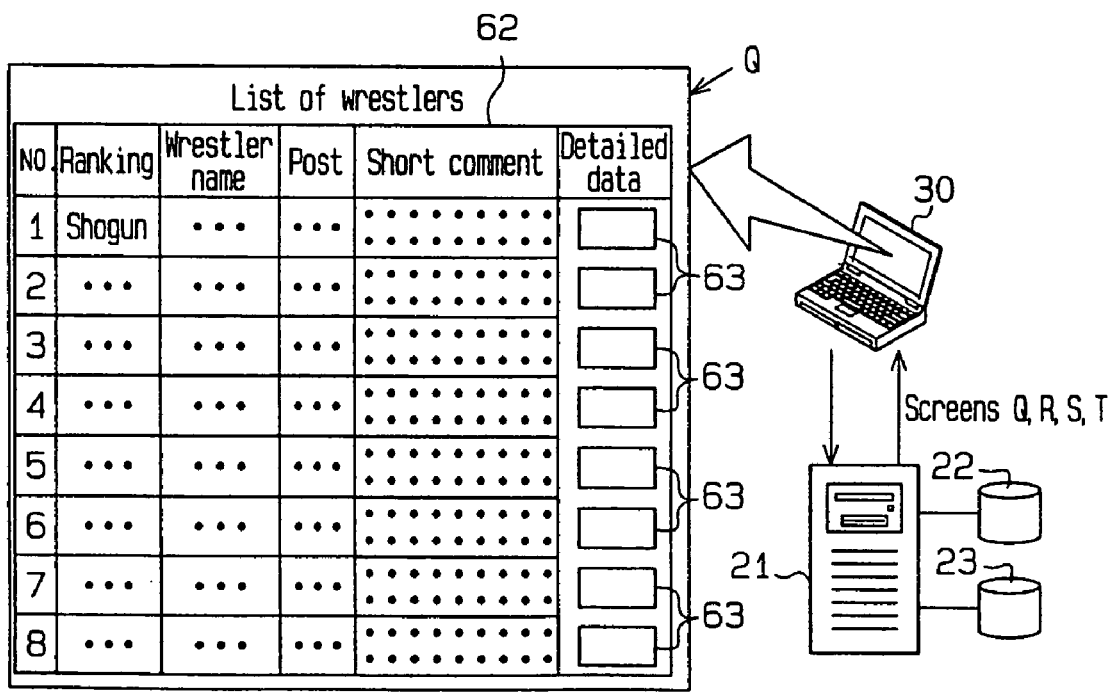
FIG. 7 is a schematic diagram of a player listing page.
Figure 12:
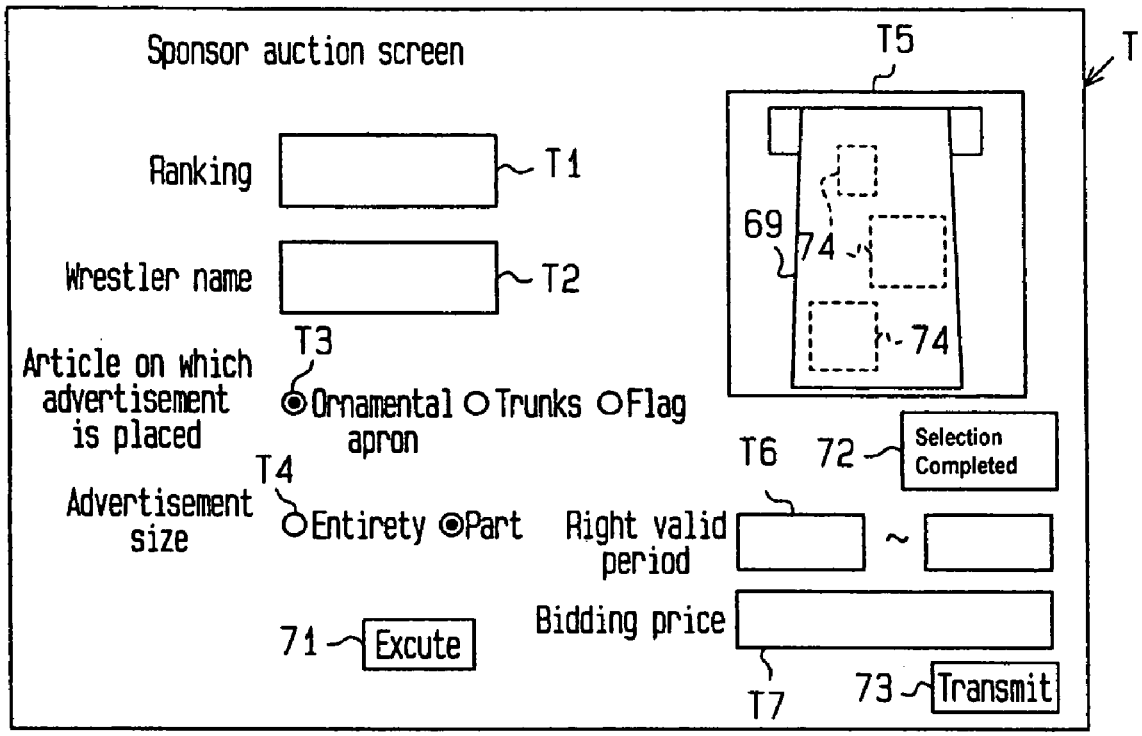
FIG. 12 is a schematic diagram of a sponsor auction page.

The home page HP is linked to a player registration page P shown in FIG. 6, a player listing page Q shown in FIG. 7, a detailed player data page R shown in FIG. 8, a sponsor registration page S shown in FIG. 9, and an auction page T shown in FIG. 12. For example, when the sponsor registration button 52 is depressed, the sponsor registration page S shown in FIG. 9 is displayed. When the participant invitation button 53 is depressed, the player registration page P shown in FIG. 6 is displayed. Data on the respective pages HP, P, Q, R, S, T, as well as programs for displaying the pages and performing a variety of processing are stored in a hard disk (not shown) of the server 21. The user displays the registration page for acquiring a desired right, registers himself as a sponsor on that page, and pays a sponsor rate to acquire a right associated with a game. A method for the registration will be described later.

Figure 5:
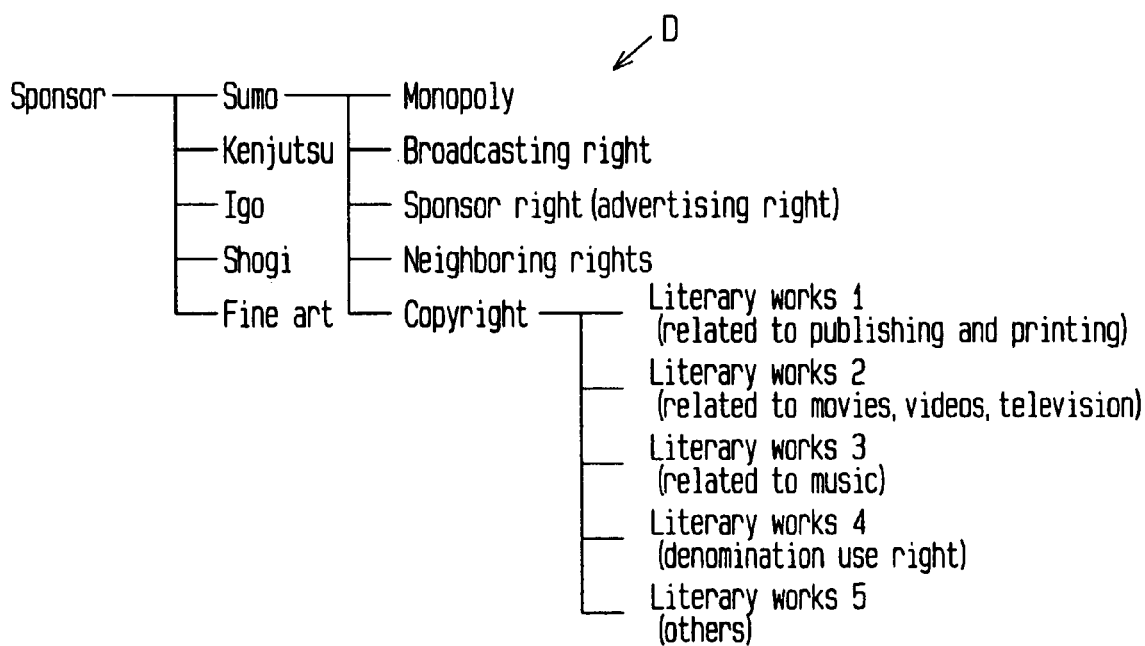
FIG. 5 shows a hierarchical data of rights to be sold.

FIG. 5 shows hierarchical data D saved in the database 23 of the server 21. The hierarchical data D includes data on the type of game (sumo, kenjutsu, igo, shogi, art competition), and data on rights for each type of game. Rights associated with sumo include, for example, advertising rights, monopoly rights, broadcasting rights, copyright neighboring rights and copyrights. Copyrights and its neighboring rights include Literal Works 1 (related to publishing and printing), Literary Works 2 (related to movies, videos and television), Literary Works 3 (related to music), Literary Works 4 (denomination use right), and Literary Works 5 (others). The monopoly in FIG. 5 means that all the rights related to an associated game are exclusively acquired.

FIG. 6 shows the player registration screen P. The player registration screen P displays data entry fields P3, P4, P5, P6, and a transmission button 61. The data entry fields P3, P4, P5, P6 include a game type entry field P1, a desired right entry field P2, a player name (team name) entry field P3, an achievement entry field P4, a game career entry field P5, an age entry field P6, a contact entry field, and a height and weight entry field. A user who desires to participate in a game enters player registration data D1, and depresses the transmission button 61 to transmit the player registration data D1 to the server 21. The server 21 saves the player registration data D1 in the data storage unit 46. A match participation permit is transmitted to the user who has registered as a player. Users have received a match participation permit can participate in district preliminary matches.

Next, registration of an advertising right will be described.

The logo marks 8 displayed on the trunks 5, the flags 6 and the ornamental apron 7 are displayed frequently on the terminal 30 while broadcasting the sumo. Since a large number of users see the logo marks 8, the resulting advertising effectiveness is high. A plurality of advertisement display areas are set on the respective advertisement display articles 5, 6, 7 such that the logo marks 8 can be displayed at a relatively low cost. In this case, a plurality of logo marks 8 are displayed on the respective advertisement display articles 5, 6, 7. In addition, the sponsor rate for a divided advertising area is relatively low. A sponsor is collected for each advertisement display area. One enterprise or one individual may monopolize all the advertising areas on the trunks 5, the flag 6 and the ornamental apron 7.

A sponsor is registered for each player 4. Generally, the effectiveness of advertisement produced by each player 4 varies depending on indices such as the ranking, achievements, real ability, popularity and talent. Therefore, the advertising effectiveness indices are set as parameters (rate parameters) for an advertising rate (sponsor rate) of the logo mark 8. Also, as the advertising rate is higher, the logo mark 8 is broadcast more frequently for a longer broadcasting time in a larger size (zoom) on the screen. In this way, the advertising rate is set in a very wide range in accordance with the advertisement display area, broadcasting processing, and advertisement effectiveness indices. Particularly, a minimum value of the advertising rate is relatively low. This allows an individual to relatively easily apply for a sponsorship. On the other hand, a player 4 with relatively low real ability and popularity may acquire a sponsor.

In this embodiment, the advertising effectiveness indices are achievements, real ability, popularity, talent, audience rating, and sales amount (which will be described later).

The ranking may be set in consideration of secondary factors such as weight, age, experienced years, other than in accordance with the real ability of each player 4. Fights may be held as a round robin between the east group and the west group (or the north group and the south group) instead of a tournament.

The audience rating is determined from the number of accesses to the home page HP during the broadcast of a contest. The sales amount and popularity of a player 4 are determined from the amount of sales in gift shops which sell character goods such as pictures (portraits) of the player 4 in the theme park. Alternatively, the result of a popularity vote for the player 4 taken in a voting booth installed in the theme park may be used as a parameter indicative of the popularity of the player 4. When a bet is made on the fight, the odds may be used as a parameter indicating popularity. The royalty for the copyright and its neighboring rights associated with character goods is distributed between the meet management company and the players.

The data storage unit 46 stores rate parameters of each player. The respective rate parameters are weighted in accordance with the effectiveness of advertisement. For example, weighting values for the achievements, real ability, popularity, talent and sales amount of a player 4 are set as $g1=0.6$ for achievements; $g2=0.5$ for real ability; $g3=0.7$ for popularity; $g4=0.4$ for talent; $g5=0.2$ for audience rating; $g6=0.2$ for sales amount, respectively. The advertising rate is calculated in accordance with a predetermined equation using the weighted rate parameters.

Next, a method of registering as a sponsor will be described.

A person who desires to register as a sponsor determines a player 4 whom he wants to sponsor with reference to the player listing page Q shown in FIG. 7 and the detailed player database R shown in FIG. 8. Then, the person who desires to register as a sponsor registers on the sponsor registration page S shown in FIG. 9.

A player listing page Q displays a player list 62 which includes a registration number, ranking, player name (nickname), team to which each player belongs, and a short comment about each player 4. As the user selects a detailed data button 63 provided for each player 4, the server 21 displays the detailed player data page R shown in FIG. 8.

The detailed player data page R displays a picture R1 of the player, player name R2, ranking R3, achievements R4, recent physical condition R5, popularity R6, past results with the next competitor R7, data R8 such as career, age, group to which the player belongs, favorite techniques, the number of times the player has defeated the champion, the number of acquired prizes, and an evaluation R9. The evaluation R9 includes a reference or remarks for determining the effectiveness of advertisement, such as real ability, the audience rating when the player participates in a match, and the like.

The sponsor registration page S displays a ranking entry field S1, player name entry field S2, advertisement displayed article selection field S3, advertising period entry field S4, display size entry field S5, advertisement data entry button 64, acceptance number entry field S6, display button 65, display position selection field S7, position establishing button 66, rate calculation button 67, advertising rate display field S8, and decision button 68.

Possible articles (trunks 5, flag 6, ornamental apron 7) on which the logo mark 8 may be displayed are displayed in the advertisement displayed article selection field S3. The user selects one of the three articles. The user enters an advertising period in the advertising period entry field S4. The user selects a desired size from a plurality of previously set sizes in the display size entry field S5. Alternatively, the user may directly enter a desired size of logo mark 8 in the display size entry field S5.

For registering image data of the logo mark 8 in the server 21, the user depresses the advertisement data entry button 64. In response, an advertisement data entry page is displayed. The user transmits the image data from the data entry page. The server 21, confirming the reception of the image data, gives an acceptance number to the image data, and notifies the user of the acceptance number. When image data of an advertisement has been already registered, the user is only required to enter its acceptance number in the acceptance number entry field S6.

As the user depresses the display button 65, an image 69 of the ornamental apron 7, which has been selected as the article on which the advertisement is to be displayed, and the image of the logo mark 8 are displayed in the display position selection column S7. A frame 70 can be moved through manipulation with a mouse. A display position is established by depressing the position establishing button 66.

As the user depresses the rate calculation button 67, entered data is transmitted to the server 21. The server 21 calculates an advertising rate in accordance with the received data. The advertising rate is determined in accordance with the rate parameters, the type of advertisement displayed article (trunks 5, flag 6, ornamental apron 7), display size, and display position. The server 21 displays the calculated rate in the advertising rate display field S8. For accepting the displayed advertising rate, the user depresses the decision button 68.

Figure 10:
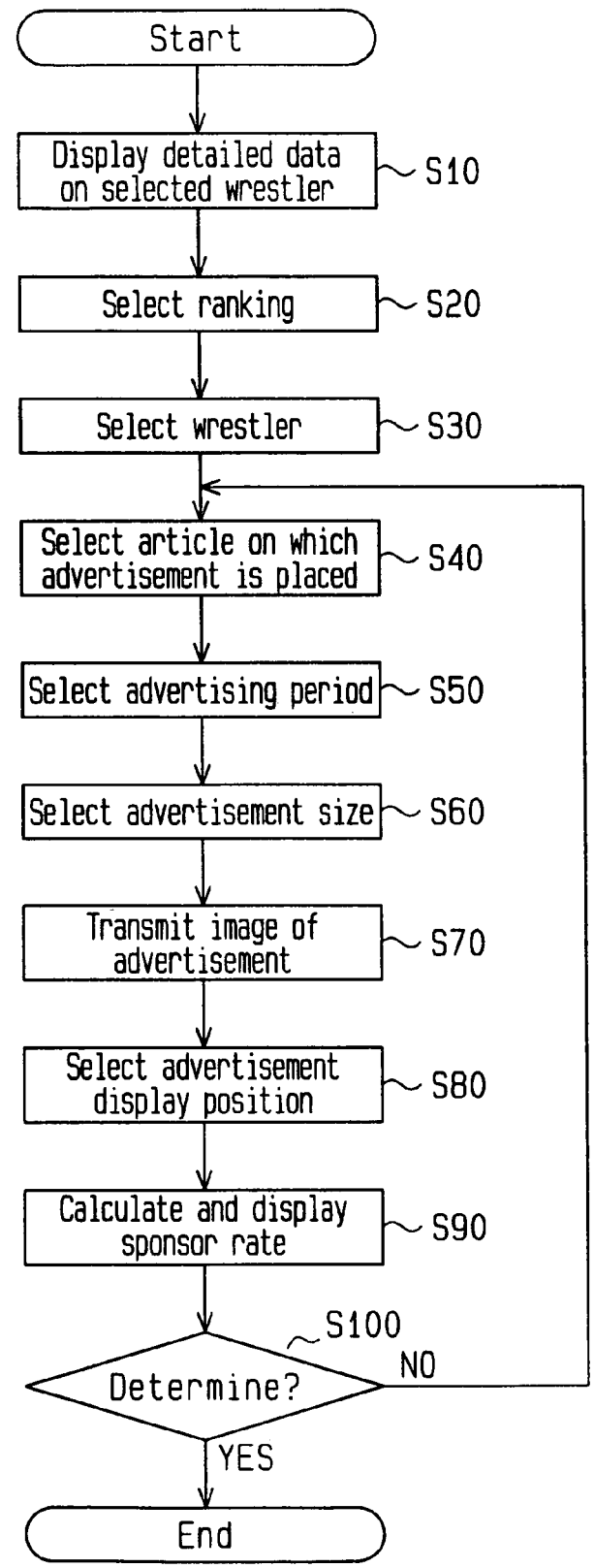
FIG. 10 is a flow chart illustrating a sponsor registering method.

A sponsor registration method will be described with reference to FIG. 10.

First, in step S10, the server 21 displays the page Q of FIG. 7 and the page R of FIG. 8 (detailed data on players 4 and information on the effectiveness of advertisement). The user determines a player 4 that he is going to sponsor with reference to the detailed data on players 4. The server 21 displays the sponsor registration page S (FIG. 9). The user enters a variety of required data on the sponsor registration page S (steps S20 to S80).

Specifically, in step S20, the user enters the ranking of the selected player 4 in the ranking entry field S1. In step S30, the user enters the name of the selected player 4 in the player name entry field S2. In step S40, the user selects one article on which the logo mark 8 is displayed. In step S50, the user enters a period during which the logo mark 8 is displayed in the advertising period entry field S4. The units for the display period include matches, the entire match period, years, months, weeks, and hours. In step S60, the user enters a display size of the logo mark 8 in the size entry field S5.

In step S70, the user first selects the advertising data entry button 64. This causes the server 21 to display the advertisement data entry page. Next, the user transmits the image data of the logo mark 8 from the advertising data entry page. The server 21 gives an acceptance number to the image data transmitted, and notifies the user of the acceptance number. The user enters the given acceptance number in the acceptance number entry field S6. When the user has registered the logo mark 8 in the past, the transmission of the image data is not required, and instead, the user enters the acceptance number of the registered logo mark 8.

Next, the user depresses the display button 65. This causes the server 21 to retrieve image data corresponding to the acceptance number from the database 23, and displays the image 69 of the selected advertisement displayed article and a display frame 70 for the logo mark 8 in the display field S7. Instead of the display frame 70, the image of the logo mark 8 may be displayed.

In step S80, the user moves the display frame 70 to a desired position, for example, by manipulating a mouse, and depresses the position establishing button 66 to determine the position at which the logo mark 8 is displayed.

In step S90, the server 21 calculates an advertising rate which is displayed on the terminal 30 of the user. Specifically, the server 21 calculates the advertising rate in accordance with the rate parameters such as the ranking, achievements, popularity, real ability, talent, audience rating, sales amount and the like of the player 4, display period, displayed article, display size, and display position. Then, the server 21 displays the calculation result in the advertising rate display column S8. The rate calculation processing in step S90 is illustrated in detail in a flow chart of FIG. 11 (which will be described later).

In step S100, the user determines whether or not he agrees with the displayed rate and the contents of the entered registration. If the user agrees, he or she depresses the decision button 68. The server 21 registers the user as a sponsor, and transmits a registration completion notice to the terminal 30 of the user. On the contrary, for disagreement, the user cancels the processing or returns to step S40 to change the entered data.

Figure 11:
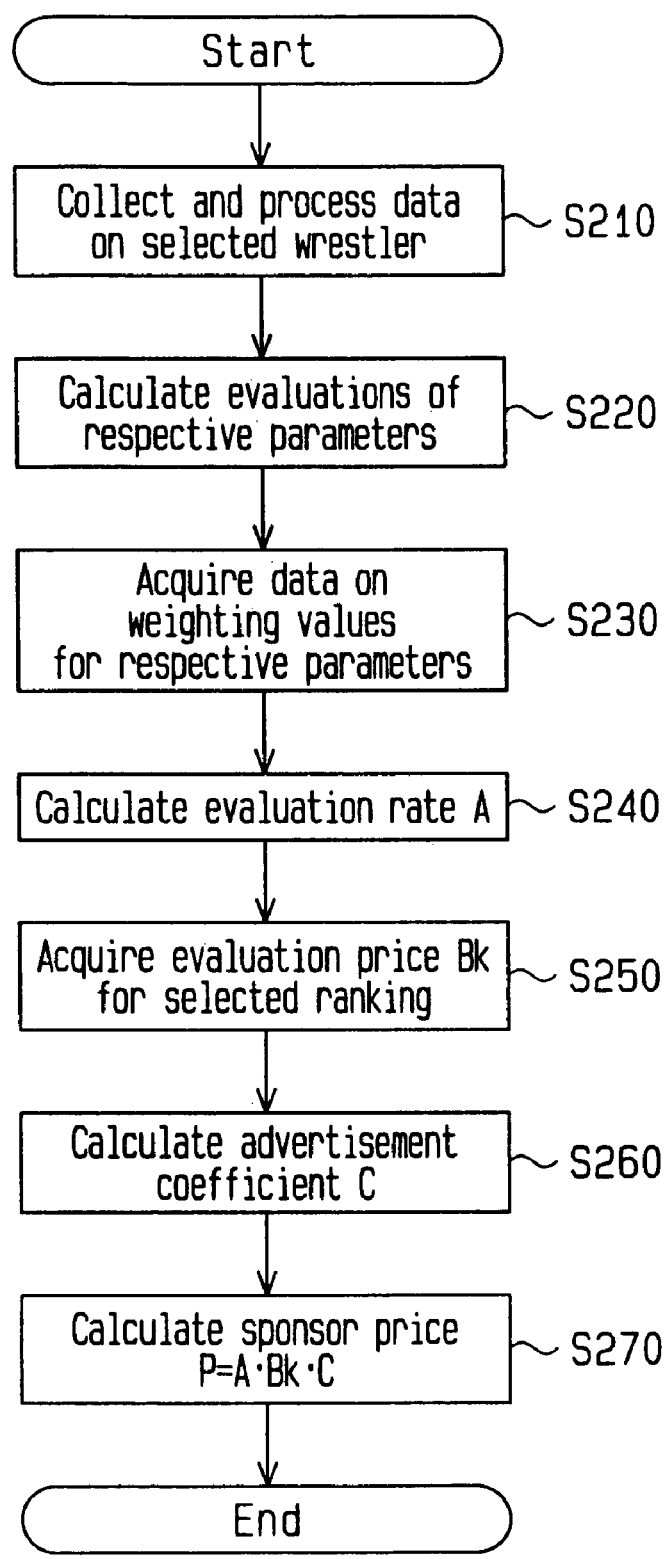
FIG. 11 is a flow chart illustrating an advertising rate calculating method.

Next, a method of calculating the advertising rate will be described with reference to FIG. 11.

In step S210, the server 21 retrieves data on a selected player 4 from the database 23. The player data includes the advertising effectiveness indices such as the ranking, achievements, real ability, popularity, talent, audience rating, sales amount and the like.

In step S220, the server 21 calculates rate parameters respectively from the data on the advertising effectiveness indices except for the ranking. For example, each of the rate parameters is calculated in a 10-point evaluation rating: $f1=8$ points for achievements; $f2=6$ points for real ability; $f3=6$ points for popularity; $f4=4$ points for talent; ...; $fn=1$ point.

In step S230, the server 21 retrieves weighting values for the respective rate parameters from the database 23. For example, the weighting values are $g1=0.6$ for achievements; $g2=0.5$ for real ability; $g3=0.7$ for popularity; $g4=0.4$ for talent; $g5=0.2$ for audience rating; $g6=0.2$ for sales amount; ...; $gn=0.2$.

In step S240, the server 21 calculates an evaluation rate A in accordance with the following equation I:

$$A=(f1 \cdot g1+f2 \cdot g2+ \ldots +fn \cdot gn)/k \qquad \text{equation I}$$

where a reference value k is an average value of evaluations which is the value when all the rate parameters $f1, f2, \ldots, fn$ of the numerator of the equation I are set to 5 points, i.e., the reference value $k=5\times(g1+g2+ \ldots +gn)$.

In step S250, the server 21 retrieves from the database 23 a standard price Bk for the ranking to which the selected player 4 belongs. The database 23 stores the standard price Bk for each of rankings K ($=1, 2, \ldots, n$). The ranking of the player 4 is a parameter for determining the standard price Bk.

In step S260, the server 21 calculates an advertising coefficient C. The advertising coefficient C is set in accordance with the article on which the advertisement is displayed, display size and display position.

In step S270, the server 21 calculates an advertising rate (right selling price) P in accordance with the following equation II:

$$P = A \times Bk \times C \quad \text{equation II}$$

The server 21 displays the calculated advertising rate P in the advertising rate display field S8, and temporarily terminates processing.

The sponsors and the meet management company can sell their advertising rights at auction. FIG. 12 shows a sponsor auction page T. The sponsor auction page T displays a ranking entry field T1, player name entry field T2, advertisement display article selection field T3, display size selection field T4, execution button 71, advertising range selection screen T5, selection completion button 72, right period display field T6, bidding price entry field T7, and transmission button 73.

The advertisement display article selection field T3 displays three articles: "ornamental apron," "trunks" and "flag." A person who desires to purchase the right selects a desired article. The display size selection field T4 displays two items "entirety" and "part." The user selects a desired item. When the user selects the entirety, the logo marks 8 of the user are exclusively displayed on the selected advertisement displayed article.

Next, the user depresses the execution button 71 to transmit desired conditions to the server 21. The server 21 searches for advertising rights which meet the desired conditions. The server 21 displays an image 69 of the advertisement display article and frames 74, each indicating a display size and a display position of a searched advertisement right candidate, which may be assigned, in the image display field T5. Three frames 74 in FIG. 12 show that there are three potential advertising display locations. The user selects a desired frame 74, and depresses the selection completion button 72.

The server 21 displays an assignment period of the right associated with the selected frame 74 in the right period display field T6. Also, the server 21 displays a minimum bidding price desired by a sponsor or the meet management company in a field, not shown. The minimum bidding price proposed by the meet management company is, for example, the advertising rate P calculated by the method of FIG. 11.

The user enters a bidding price in the bidding price field T7, and then depresses the transmission button 73. In this way, the user is registered in the server 21 as a bidder.

The sponsor auction page T may be provided with a field for entering a desired assignment period of a person who desires a purchase. Alternatively, the user may enter a desired period in the right period display field T6 from the terminal 30. In this case, the server 21 displays a frame 74 for an advertising right candidate which meets the desired assignment period.

Figure 13:
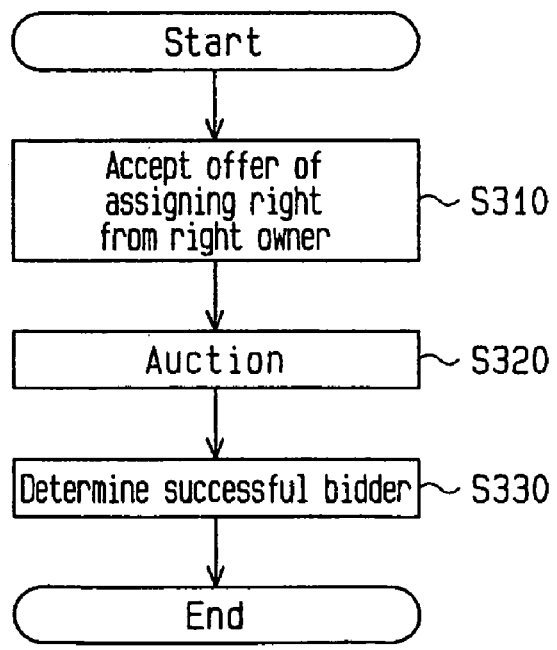
FIG. 13 is a flow chart illustrating an auction method.

FIG. 13 is a flow chart illustrating the flow of an auction.

First, in step S310, the server 21 displays in the home page HP that those who desire to assign advertising rights are collected from advertising right owners. It should be noted that when the meet management company desires to assign its rights, step S310 is skipped. In step S320, the server 21 starts the auction. After a predetermined bidding period expires, the server 21 determines the bidder who has proposed a maximum value as a successful bidder in step S330.

The successful bidder transmits the image data of the logo mark 8 to the server 21, and pays a predetermined charge to the former right owner. The auction allows the former right owner to sell advertising rights at a higher price. While this auction is held by the meet management company, an agent consigned by the meet management company may hold the auction.

As described above in detail, this embodiment provides the following effects.

Since meets held in the theme parks are broadcast through the internet, an increased number of viewers can become interested in the contest and Japanese culture. With the increase in viewers, more persons will visit the theme park. Since the rates for advertisements employing players 4 participating in the meet are added to the profits of the theme park, the meet contributes to the profit of the theme park.

The advertising rate (sponsor rate) is set in a wide range in accordance with the rate parameters such as achievements, real ability, popularity, talent, audience rating, and sales amount of a player 4. Therefore, an enterprise can advertise at a desired expenditure. Particularly, small-scale enterprises and individuals can sponsor and advertise at relatively low rates.

Since the advertising rates are set in accordance with the display position and the display size of the logo mark 8, the advertising rate is set in a wide range.

The advertising rate per displayed advertisement is set relatively low by displaying advertisements such as a plurality of logo marks 8 on clothing of a player 4 and a flag. Therefore, small-scale enterprises and individuals can sponsor and advertise at a relatively low rate.

A single player 4 can acquire a plurality of sponsors by displaying different advertisements such as a plurality of logos 8 on his clothing and a flag.

The user can determine the value of an advertisement produced by each player 4 from data displayed on the terminal 30 such as achievements, real ability, popularity, talent, audience rating and sales amount.

The sponsor rate of each player 4 varies depending on the achievements and popularity of the player 4. Thus, the player 4 can acquire a higher sponsor rate if the player 4 has an aggressive match.

Even a player 4 with relatively low achievements and popularity can acquire sponsors.

Since many players 4 with high real ability desire to participate in the meet, the quality of matches is improved, resulting in an increase in the number of visitors to the theme park and a higher popularity of the home page HP that broadcasts the matches. The increased popularity of the home page HP results in a higher advertising effectiveness and an increased number of sponsors. Also, the sports (sumo, kenjutsu, and the like) will grow to be international sports.

By selling advertising rights by auction, a purchased right can be assigned to a third party at a higher amount. For example, as achievements and popularity of a player 4, sponsored by an enterprise or an individual, become higher, the value of the advertising right possessed by the sponsor is increased. Therefore, the advertising right can be treated as an object of investment, and a large income source for right owners (including the meet management company), players 4 and teams.

Since matches are broadcast all over the world through the internet, sponsors can advertise all over the world, so that a high advertising effectiveness is provided.

This embodiment may be modified in the following manner.

The logo mark 8 may be displayed on a uniform of a team. In this case, the advertising rates are determined based on achievements, popularity, real ability, talent, audience rating, sales amount and ranking of the team. A basic amount for the advertising rate of the team is set in accordance with the ranking of the team. The ranking of the team is the rank determined, for example, from the number of victories and a difference between obtained points and lost points. A plurality of display areas may be set on the uniform of each member. An advertising rate of each player is determined in accordance with rate parameters of each player. A common logo mark 8 may be displayed on all members of a team, or different logo marks 8 may be displayed on each of member of a team.

A sponsor may display on the home page HP that a discount sale will take place in a particular shopping mall. In this case, the home page HP displays a discount information button linked to a page of the sponsor's shopping mall.

A right owner may choose the successful bidder of an auction instead of the server 21. In this case, the server 21 creates a list of proposed amounts of bidders and transmits the list to a terminal 30 possessed by the right owner. Alternatively, the server 21 may create a list that shows only a limited number of bidders who have proposed higher amounts (successful bidder candidates) and transmits the list to the terminal 30 of the original right owner.

Advertisement displayed articles are set in accordance with particular games. The advertisement display articles include, for example, a cap, helmet, gloves, mask, uniform, jumper and gown.

The contests are not limited to tournaments, but may be a league, round robin between players of two groups or a competition in accordance with the rules of Japanese sumo. In this case, since a lower ranked player can compete with a higher ranked player, the lower ranked player will receive exposure to a large audience through the internet broadcast.

The matches may be broadcast on normal televisions instead of internet television.

For example, with a television that has the ability to perform bidirectional communication, a page for sponsor registration may be provided in a program showing a match under way.

Instead of the server 21, a second server dedicated to broadcasting internet television may be responsible for the broadcasting. In this case, the meet management company may be different from the broadcasting company. Also, a separate company for collecting sponsors may be established other than the meet management company.

The audience rating is not limited to that of the internet television, but may be the audience rating of normal television.

The meet may be open only to visitors to the theme park.

The advertisement display processing includes, for example, audio announcement and telop displays.

The game and match used herein refer to events for ranking players, teams and works. Entry items are added to the sponsor registration page S in accordance with each event.

For example, the games and matches may include those played bare-handed such as women's sumo, karate, judo (jujutsu); Chinese boxing such as Taikyokuken; aikido (Japanese martial art); wrestling; boxing; kick boxing; tekondo; martial arts; armed fights such as kendo and bojutsu (using a stick as a weapon); shurikenjutsu (knife throwing), gun arts; and hybrid matches of a plurality of types of such contests. Games include games in which individuals or teams compete, such as chess, cards, mahjong, video games and the like. In addition, the games and matches may include ball games such as baseball, soccer, basket ball, tennis, rugby, American football, golf, volleyball, and the like. The contest may further include field and track events such as marathon, short distance races, javelin throw, pole vault and the like. The contest may also include winter sports such as ski, skate, ice hockey and the like. The contest may include general sports events such as triathlons, swimming, gymnastics, road cycling, car races, motor bike races, track cycling, horse races, speedboat races and the like. Further, animal events such as dog races may be included.

For example, since viewers of men's sumo are usually different from those of women's sumo in generation and gender, those who desire to be sponsors may select appropriate matches in accordance with the viewers they want to reach. The rate parameters include the sex of each player.

The matches may include intellectual events for competing cultural, medical and scientific techniques and knowledge. Examined through the intellectual events are articles, technical art works, public performance (songs and dramas), and examinations. The examinations include, for example, written examinations on topics such as mathematics the Olympics, languages, and philosophy. Players (creators or performers) submit items to be examined in an event place (contest place). Winners are selected by judges.

The cultural contests may include theatrical art (music, dance, drama, movies and the like); fine art (picture, graphics, sculpture, architecture and the like); linguistic art (poems, sentences, translations, dramatization, scenario, recitation, rhetoric and the like); technical art (gold craftsmanship, book binding, tool manufacturing, wood sculpture and the like); social art (media, communication media, communication techniques and the like); and ecological art (ecology, cities and health, and the like).

The medical contests may include current medical science (genetic engineering, biochemistry, biotechnology and the like); traditional medical science; replacement therapies; oriental medical science; Chinese medical science; and holistic medical science.

The science contests may include physics, chemistry, biology, biochemistry, electronic engineering, computer, IT (information technology), biotechnology, atomic energy, energy, genetic engineering, environmental engineering, space development, and mobile engineering (including car, shipping and aircraft).

The progress of the cultural events, scientific events and intellectual events is displayed on the home page HP. In this way, players (scientists, intellectuals, artists) and examined items (research articles, works and the like) become famous, resulting in a higher value for rights of the players such as a copyright rights. As a result, the player can readily acquire sponsors who donate funds for research. Those who desire to sponsor, on the other hand, directly specify a player from the home page HP, or indirectly specify a player by specifying an examined item.

The name of a sponsor is displayed, for example, on the home page, pamphlets distributed at an event place, and posters. For example, if a potential sponsor demonstrates that he will donate funds for researchers and activity groups in a field desired by many persons such as an environmental problem, his reputation will improve. Also, the research in the specified field will be advanced by more donated funds.

The rights include a right to devise player clothing; rights generated from legal registration and the like; rights that naturally accrue based on the existence and actions of a natural person or a legal person; and a variety of privileges given to users by the meet management company. The copyright includes an author's character license, reproduction rights, game rights, broadcasting rights and wired broadcasting rights, lending rights, translation rights, interpretation rights, utilization rights, and transmission rights for secondary literary works, audio recording rights, video recording rights, dictation rights, assignment rights, exhibition rights, distribution rights, and portrait rights.

Sponsors can be invited, for example, to conferences and work exhibitions, receive research reports, and purchase preferentially or at a lower price articles and works (high technology articles (including drugs and the like) in a variety of fields such as electric, mechanic, biology and the like, therapies, art works, and books) created from the research and cultural activities as compensation for the donation of funds for cultural activities.

The meets may be held in ordinary stadiums or public facilities other than in the theme parks. Also, the game matches may be played on the internet home page. In this case, players participate in the matches through manipulations of keys on their terminals 30.

The name of article, the name of a sponsoring enterprise, or a combination thereof may be displayed instead of the logo mark 8.

It should be apparent to those skilled in the art that the present invention may be embodied in many other specific forms without departing from the spirit or scope of the invention. Therefore, the present examples and embodiments are to be considered as illustrative and not restrictive and the invention is not to be limited to the details given herein, but may be modified within the scope and equivalence of the appended claims.

What is claimed is:

1. A method of selling a right through a computer network of indicating an advertisement on an article associated with a contestant participating in a contest, wherein the contest is to be broadcast through the computer network, the method comprising:

transmitting to a terminal computer of a potential buyer an indicator of advertising effectiveness for a contestant, wherein the indicator represents at least one of the following characteristics of the contestant: achievements of the contestant, popularity of the contestan, physical ability of the contestant, talent of the contestant, audience rating of the contestant, and sales amount of the contestant, said sales amount of the contestant is determined from the amount of sales of goods associated with the contestant;

displaying, on the terminal computer of the potential buyer, a page for designating a display position and a display size of the advertisement on the article as the advertisement will be displayed during the contest when the article is visible to an audience, wherein the page displays an image of the article and a frame of the advertisement and is adapted to provide changing of the position and the size of the frame of the advertisement on the image of the article through manipulation of the frame of the advertisement with a mouse device of the terminal computer of the potential buyer;

determining a selling price for the right in accordance with a predetermined mathematical expression using numerical parameters including the display position and the display size of the advertisement designated by the potential buyer, and the indicator of advertising effectiveness of the contestant; and displaying both of an image that shows the display position and the display size of the advertisement designated by the potential buyer and the selling price on the terminal computer of the potential buyer.

2. The method according to claim 1, wherein a potential buyer transmits a proposed price for the right through the associated terminal.

3. The method according to claim 2, further comprising:
evaluating amounts proposed by buyers; and
determining a successful buyer based on the highest proposed amount.

4. The method according to claim 1, further comprising transmitting data of a home page for selling the right through the computer network, the selling price being displayed on the home page.

5. The method according to claim 4, wherein the step of selling the right is an auction, wherein buyers select a contestant, and the buyers transmit desired purchase prices from terminals to a server.

6. The method according to claim 4, wherein the home page displays a field for selecting the contestant a field for displaying a display size and a display position of the advertisement, a calculation button for instructing the server to calculate the advertising rate, and a price display field for displaying as result of the calculation.

7. The method according to claim 1, wherein the selling price increases as the audience rating increases.

8. The method according to claim 1, wherein the game is broadcast through the internet, and the audience rating is determined from the number of accesses to a home page on which the game is broadcast.

9. The method according to claim 8, further comprising holding the match in a theme park.

10. The method according to claim 9, wherein the parameter represents at least a sales amount indicating the total sales of goods sold in the theme park associated with the contestant, and the selling price increases as the sales amount increases.

11. The method according to claim 1, wherein the article has a plurality of areas for displaying advertisements.

12. The method according to claim 11, wherein the article includes at least one of clothing worn by the contestant during the contest, and a flag associated with the contestant.

13. The method according to claim 12, further comprising:
receiving a selection from the potential buyer of the article; and
displaying an image of the selected article on a screen of the terminal computer of the potential buyer.

14. The method according to claim 1, wherein the numerical parameter includes a ranking coefficient for the contestant, wherein the selling price increases higher as the ranking coefficient increases.

15. The method according to claim 1, wherein the selling price increases as the achievements increases.

16. The method according to claim 1, wherein the selling price increases as the popularity parameter increases.

17. The method according to claim 1, wherein the contest is a contest of sumo, kenjutsu, igo, shogi, chess, science, culture or intellect.

18. The method according to claim 1, wherein the contestant includes an individual, a team, and a work object.

19. The method according to claim 1, wherein the numerical parameters further include a broadcasting frequency, a broadcasting time and a zoom ratio of the advertisement.

20. The method according to claim 1, further comprising distributing profits obtained by selling the right between a contest management company and the player.

21. A system for selling a right through a computer network of indicating an advertisement on an article associated with a contestant participating in a contest, comprising:

a server computer programmed to:

transmit to a terminal computer of a potential buyer an indicator of advertising effectiveness for a contestant, the indicator representing at least one of the following characteristics of the contestant: achievements of the contestant, popularity of the contestant, physical ability of the contestant, talent of the contestant, audience rating of the contestant, and sales amount of the contestant, said sales amount of the contestant is determined from the amount of sales of goods associated with the contestant;

display, on the terminal computer of the potential buyer, a page for designating a display position and a display size of the advertisement on the article as the advertisement will be displayed during the contest when the article is visible to an audience, wherein the page displays an image of the article and a frame of the advertisement and is adapted to provide changing of the position and the size of the frame of the advertisement on the image of the article through manipulation of the frame of the advertisement with a mouse device of the terminal computer of the potential buyer;

determine a selling price for the right in accordance with a predetermined mathematical expression using numerical parameters including the display position and the display size of the advertisement designated by the potential buyer, and the indicator of advertising effectiveness of the contestant; and display both of an image that shows the display position and the display size of the advertisement designated by the potential buyer and the selling price on the terminal computer of the potential buyer.

22. The server computer according to claim 21, further operable to:

broadcast a match in which the contestant participates through the network;

evaluate desired purchase prices proposed by a plurality of buyers; and select a buyer that proposed the highest amount.

23. The method according to claim 1, further comprising:

operating, by the potential buyer, the terminal computer to change the display position and the display size of the advertisement, if the potential buyer disagrees with the selling price;

re-determining the selling price using the numerical parameters including the changed display position, the changed display size, and the indicator; and transmitting the re-determined selling price to the terminal computer via the computer network.

24. The method according to claim 23, wherein the step of operating the terminal computer to change the display position and the display size of the advertisement includes moving the image of the advertisement displayed on the terminal computer through manipulation with a mouse device.

25. A method of selling an advertisement to a potential buyer through a computer network, the advertisement to be displayed on an article associated with a contestant participating in a contest, the method comprising:

broadcasting the contest on a bidirectional communication terminal device of the buyer while displaying a sponsor registration page on the bidirectional communication terminal device, the bidirectional communication terminal device connected to the computer network;

transmitting an advertising effectiveness indicator for a contestant to the bidirectional communication terminal device, wherein the indicator represents at least one of the following characteristics of the contestant: achievements of the contestant, popularity of the contestan, physical ability of the contestant, talent of the contestant, audience rating of the contestant, and sales amount of the contestant, said sales amount of the contestant is determined from the amount of sales of goods associated with the contestant;

displaying, on the bidirectional communication terminal device, a page for designating a display position and a display size of the advertisement on the article as the advertisement will be displayed during the contest when the article is visible to an audience, wherein the page displays an image of the article and an image or a frame of the advertisement and is adapted to provide changing of the position and the size of the frame of the advertisement on the image of the article with a mouse device of the bidirectional communication terminal device of the potential buyer;

determining a selling price for the right in accordance with a predetermined mathematical expression using numerical parameters including the display position and the display size of the advertisement designated by potential the buyer, and the indicator of advertising effectiveness; and displaying, on the bidirectional communication terminal device of the potential buyer, a page including both of an image that shows the display position and the display size of the advertisement designated by the potential buyer and the selling price for enabling approval of the selling price by the potential buyer, wherein said broadcasting includes broadcasting the advertisement more frequently for a longer broadcast time and in a larger zoom size on the bidirectional communication terminal device as the selling price of advertisement increases.

26. A server computer system for selling a right through a computer network of indicating an advertisement on an article associated with a contestant participating in a contest, comprising:

a server computer programmed to:

display a page for sponsor registration on a bidirectional communication terminal device of a potential buyer, connected to the computer network, when the contest is being broadcast on the bidirectional communication terminal device;

transmit to the bidirectional communication terminal device an indicator of advertising effectiveness indicator for a contestant, the indicator representing at least one of the following characteristics of the contestant: achievements of the contestant, popularity of the contestant, physical ability of the contestant, talent of the contestant, audience rating of the contestant, and sales amount of the contestant, said sales amount of the contestant is determined from the amount of sales of goods associated with the contestant;

display, on the bidirectional communication terminal device of the potential buyer, a page for designating a display position and a display size of the advertisement on the article as the advertisement will be displayed during the contest when the article is visible to an audience, wherein the page displays an image of the article and a frame of the advertisement and is adapted to provide changing of the position and the size of the frame of the advertisement on the image of the article through manipulation of the frame of the advertisement with a mouse device of the bidirectional communication terminal device of the potential buyer;

determine a selling price for the right in accordance with a predetermined mathematical expression using numerical parameters including the display position and the display size of the advertisement designated by the potential buyer, and the indicator; and display, on the bidirectional communication terminal device of the potential buyer, a page including both of an image that shows the display position and the display size of the advertisement designated by the potential buyer and the selling price for approval of the selling price by the potential buyer, wherein the advertisement is broadcast on the bidirectional communication terminal device more frequently for a longer broadcast time and in a larger zoom size on the bidirectional communication terminal device as the selling price of advertisement increases.

* * * * *